United States Patent [19]

Kalsi

[11] Patent Number: 5,668,090
[45] Date of Patent: Sep. 16, 1997

[54] HIGH-TEMPERATURE AC SUPERCONDUCTING MAGNETS FOR A MAGNETIC LEVITATION SYSTEM

[75] Inventor: Swarn S. Kalsi, Salonga, N.Y.

[73] Assignee: Grumman Aerospace Corporation, Los Angeles, Calif.

[21] Appl. No.: 274,170

[22] Filed: Jul. 14, 1994

[51] Int. Cl.$^6$ .............................. B60L 13/10; H01F 6/00
[52] U.S. Cl. ......................... 505/166; 310/12; 104/293; 104/286
[58] Field of Search .................... 310/12; 104/281, 104/282, 284, 285, 286, 291, 292, 293, 294; 505/150, 166, 705, 852, 879, 902, 905, 908

[56] References Cited

U.S. PATENT DOCUMENTS

| | | | |
|---|---|---|---|
| 4,953,470 | 9/1990 | Yamaguchi | 104/282 |
| 5,034,243 | 7/1991 | Chiba et al. | 427/48 |
| 5,094,173 | 3/1992 | Tada et al. | 104/282 |
| 5,152,227 | 10/1992 | Kato | 104/286 |
| 5,189,961 | 3/1993 | Fujie | 104/281 |
| 5,479,145 | 12/1995 | Kalsi | 335/297 |

OTHER PUBLICATIONS

K. Sato et al. "High-Jc Silver-Sheathed Bi-Based Superconducting Wires," IEEE Transactions on Magnetics, vol. 27, No. 2, Mar. 1991.

P. Halder et al. "Processing High Critical Current Density Bi-2223 Wires and Tapes," JOM, Oct. 1992.

K. Sato et al., "Development of Silver-Sheated Bismuth Superconducting Wires and Their Application (invited)", J. Appl. Phys. 70 (10), Nov. 1991.

Primary Examiner—Steven L. Stephan
Assistant Examiner—Judson H. Jones
Attorney, Agent, or Firm—Terry J. Anderson; Karl J. Hoch, Jr.

[57] ABSTRACT

An electromagnet for a MAGLEV system incorporates at least one superconducting coil, operating in AC mode, which surrounds a multiple-pole iron core and is constructed from a layer of epoxy-impregnated pancake coils assembled together along a common axis within a cryostat. The windings of each pancake coil may be constructed from predetermined lengths of Bi(2223) superconductor tape. The coil preferably operates at 77 K. but any temperature lying in a range of 5 K. to 80 K. may be used. Two- and six-pole/coil magnets operating in either AC or DC mode are specifically disclosed.

18 Claims, 6 Drawing Sheets

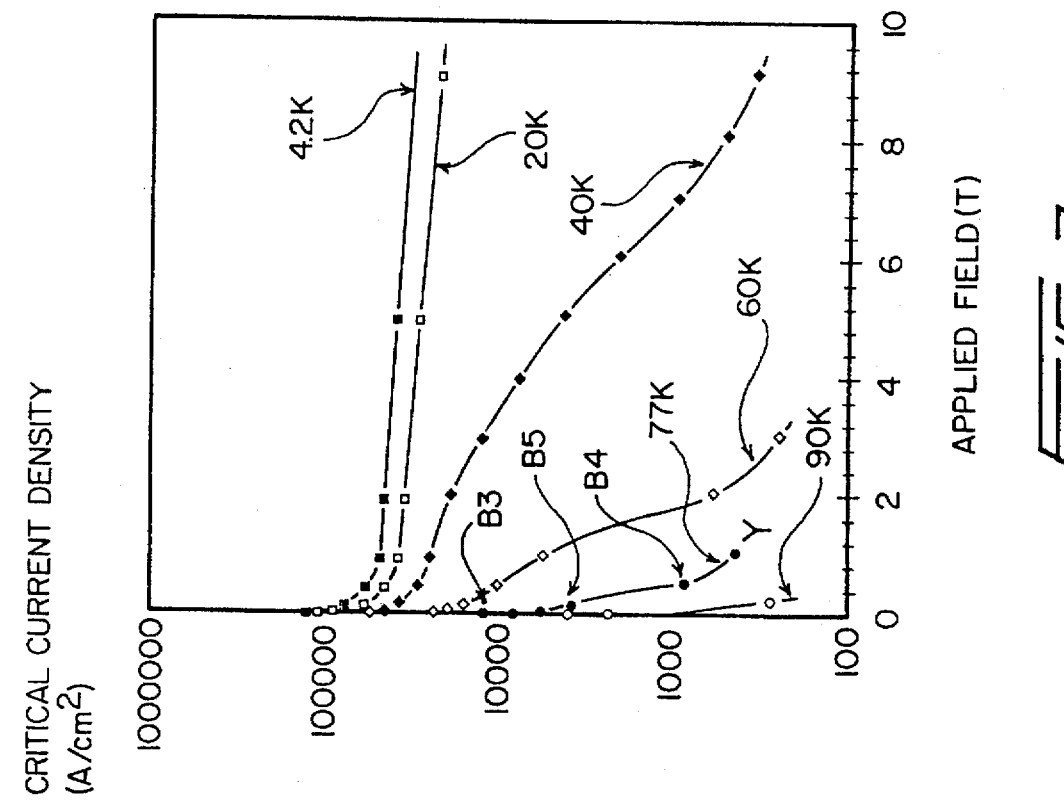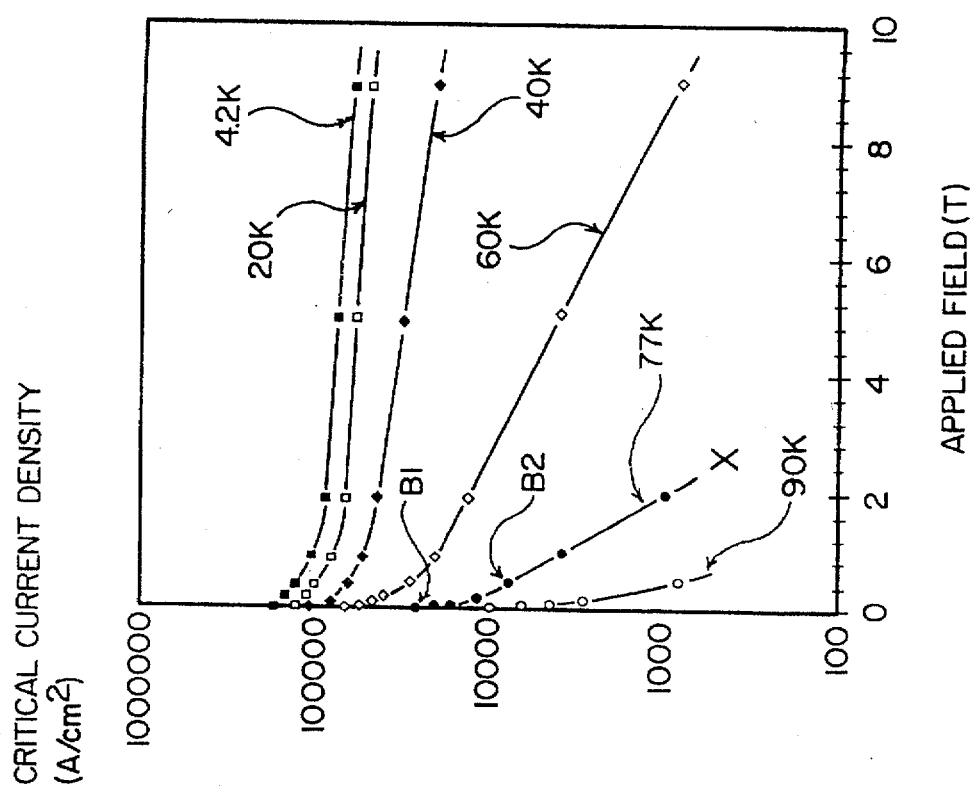

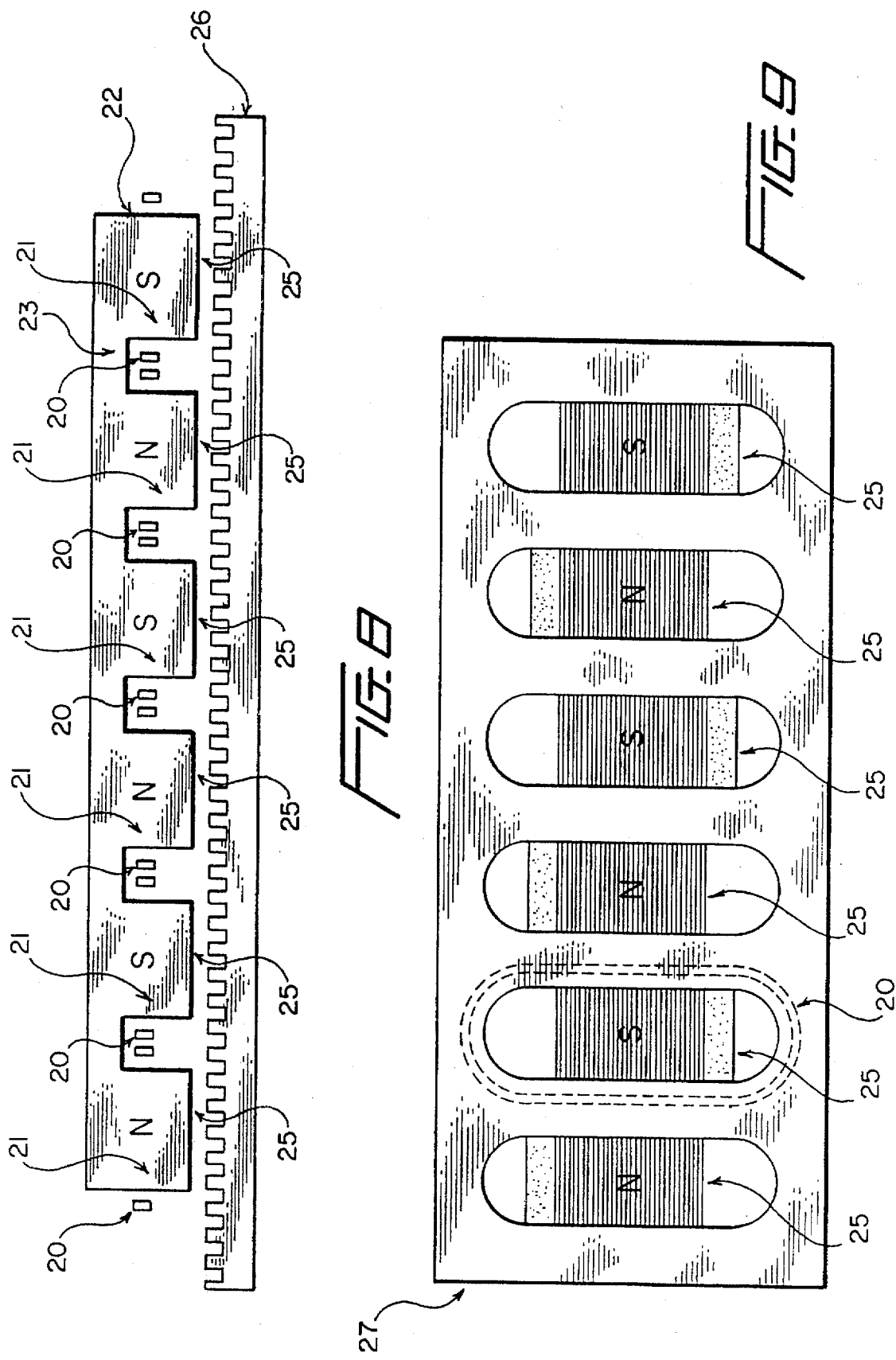

HIGH-TEMPERATURE AC SUPERCONDUCTING MAGNETS FOR A MAGNETIC LEVITATION SYSTEM

BACKGROUND OF THE INVENTION

1. Field of the Invention

This invention generally relates to a high-speed magnetic levitation transportation system, and more particularly to a superconducting magnet for levitating and propelling a MAGLEV vehicle along a guideway.

2. Description of the Related Art

Referring to FIG. 1, a superconducting magnet 100 includes six low-temperature superconducting (LTS) coils 105 operating in DC mode surrounding respectively six leg portions 110 of a laminated iron core 115. The leg portions of the core project from a core base 120, which is mounted along a side of a MAGLEV vehicle in such a manner that alternating north and south magnetic poles surfaces 125, located at an end of each core leg, are suspended a predetermined distance away from and in opposing relation to a ferromagnetic rail 130 of a vehicle guideway.

In operation, DC excitation current supplied to the LTS coils from a constant current power source causes the coils to induce primary magnetic fields in their respective core poles. The core poles, as a result, become magnetically attracted to a vehicle guideway, counterbalancing the loading of the MAGLEV vehicle to cause the vehicle to levitate off the surface of the rail by a distance proportional to the strength of the magnetic fields induced in the cores.

MAGLEV superconducting magnets of the type just described have a number of drawbacks. One rather obvious drawback is the sophisticated cryostats these magnets must employ in order to fulfill the cooling requirements of the LTS coils. These cryostats, unlike higher temperature systems, must be equipped with on-board refrigerators that provide a continuous supply of low-temperature refrigerant for maintaining the LTS coils in a superconducting state, which, in some cases, may be at temperatures as low as 4 K. Because of the low-temperature requirement, these cryostats must be more thoroughly insulated, compared with higher temperature cryogenic systems, in order to protect the LTS coils from being compromised by heat loads leaking into the interior of the cryostat from the outside environment. The use of sophisticated cryostats of this type adds considerably to the cost and complexity of building, operating, and maintaining the superconducting magnet.

Another drawback centers around the inability of LTS coils to perform adequately under AC conditions. In practice, excitation current supplied to an LTS coil cannot be changed at a rate faster than 1 Hz, otherwise the coil will lapse into a non-superconducting state and the MAGLEV system will fail. LTS coils therefore must at all times be operated in DC mode.

Having to operate the LTS coils in DC mode is undesirable for a number of reasons. The first concerns vehicle stability and the inability of LTS coils to correct deviations in the air gap between the core poles and rail.

Regardless of whether the MAGLEV transport vehicle is at rest or in motion, the distance between the core poles and rail varies with changes in vehicle loading, wind loading, and vehicle pitch angle. In order to maintain vehicle stability, rapid correction of the pole-to-rail gap back to a desired length (e.g., 4 to 5 cm.) is imperative. LTS coils, however, are unable to make the rapid corrections required because, as previously discussed, the excitation current supplied to the coil cannot be changed faster than a rate of 1 Hz without causing the coil to lapse into a non-superconducting state.

To compensate for the slow reaction time of the LTS coils, fast-reacting non-superconducting control coils must be used to correct these deviations. Six control coils of this type, labeled 140, are included in the magnet shown in FIG. 1. Control coils 140, operating at a rate as high as 20 Hz, are included around the ends of the core legs for making rapid, fine-tuned adjustments to the pole-to-rail gap whenever the gap deviates from its desired length.

In operation, excitation current supplied to the control coils induces a secondary magnetic field in the core which, when added to the primary field already induced in the core by the superconducting coil, increases the forces of attraction between the core poles and rail to correct the size of the gap. Control coils 140 may be activated to adjust the total excitation in the core poles in either buck or boost mode.

Having to employ control coils to compensate for the shortcomings of the LTS coils increases the power and hardware requirements of the magnet, which, as in the case of the cryostat, translates into increased construction and operating costs.

Another reason DC operation is undesirable is the susceptibility of the LTS coils to being corrupted by external fields generated by the control coils. These external fields are highly undesirable because they can cause the LTS coils to lapse into a non-superconducting state. In order to neutralize the effects of external fields on the LTS coils, the superconducting magnet must be equipped with a control system, which modulates the current supplied to the control coils in such a manner so as to ensure that the LTS coils remain in DC mode.

Control systems of this type are disadvantageous because, one, they provide only a limited degree of control and, two, they, like the control coils themselves, add to the complexity and cost of operating and maintaining the magnet.

A need therefore exists for a superconducting magnet for a MAGLEV system which overcomes the problems realized by superconducting magnets which use LTS coils operating in DC mode, and further which can be built, operated, and maintained for a fraction of the cost of such magnets.

SUMMARY OF THE INVENTION

It is one objective of the present invention to provide a superconducting coil operating in AC mode.

It is another objective of the present invention to provide a superconducting coil which can operate in both AC and DC modes.

It is another objective of the present invention to provide a superconducting coil of either type just described which can operate at high as well as low superconducting temperatures.

It is another objective of the present invention to provide a MAGLEV superconducting magnet which is more economical to build, operate, and maintain compared with superconducting magnets which use LTS coils operating in DC mode, this economy being achieved through the use of a superconducting coil that can 1) correct pole-to-rail gap deviations fast enough to alleviate the need for control coils to perform this function and 2) operate effectively within a cryostat which does not require the extensive insulation and on-board refrigerators required by LTS coil cryostats.

The foregoing and other objectives of the invention are achieved by providing a superconducting coil for a MAGLEV system which operates in AC mode. A preferred embodiment of the AC coil is constructed from a layer of epoxy-impregnated pancake coils assembled together along a common axis within a cryostat. The windings of each pancake coil are constructed from a plurality of commercially-available superconductor tapes. Bi(2223) superconductor tape is selected because it realizes near zero AC losses at frequencies as high as 20 Hz, and because of its ability to demonstrate superconductivity at any temperature lying in a range between 4.2 K. and 80 K. The superconducting coil therefore advantageously may be constructed to operate in AC mode at high and low superconducting temperatures.

The ability to operate the superconducting coil in AC mode advantageously allows the coil to respond fast enough to correct pole-to-rail gap deviations, thus alleviating the need for the control coils required by LTS magnets.

The superconducting magnet of the present invention includes at least one AC superconducting coil surrounding a multiple-pole iron core. A first preferred embodiment of the magnet includes two AC high-temperature superconducting (HTS) coils operating at 77 K. surrounding respectively two poles of a C-shaped, laminated iron core. Both coils are maintained within a single high-temperature cryostat, which is attached to the iron core and which contains an inventory of liquid nitrogen for cooling the coils.

The superconducting coil, if desired, may operate in DC mode without any modification to the magnet, and can be configured to operate at temperatures other than 77 K. Embodiments for coils operating at 60 K., 40 K., and 20 K. are specifically discussed.

A second preferred embodiment of the superconducting magnet of the present invention includes six AC HTS coils operating at 77 K. surrounding respectively the poles of a six-pole iron core. As in the case of the two-pole embodiment, a common cryostat is used to satisfy the refrigeration requirements of all six HTS coils.

The magnetic field distribution in an area proximate to the core poles of each embodiment of the superconducting magnet shows that there is minimal leakage field in the coil winding pack, and that most of the magnetic flux is contained within the iron core.

BRIEF DESCRIPTION OF THE DRAWINGS

FIG. 2 is a graph showing six curves plotting the performance of Bi(2223) superconductor tape operating at a variety of temperatures under conditions where the field is parallel to the broad surface of the tape, which tape is contemplated for use in constructing the superconducting coil of the present invention.

FIG. 3 is a graph showing six curves plotting the performance of Bi(2223) superconductor tape operating at a variety of temperatures under conditions where the field is perpendicular to the broad surface of the tape, which tape is contemplated for use in constructing the superconducting coil of the present invention.

FIG. 8 is a diagram showing a second preferred embodiment of the superconducting magnet of the present invention.

FIG. 9 is a diagram showing a cryostat contemplated for use in accordance with a second preferred embodiment of the superconducting magnet of the present invention.

DESCRIPTION OF THE PREFERRED EMBODIMENTS

Figure 1:
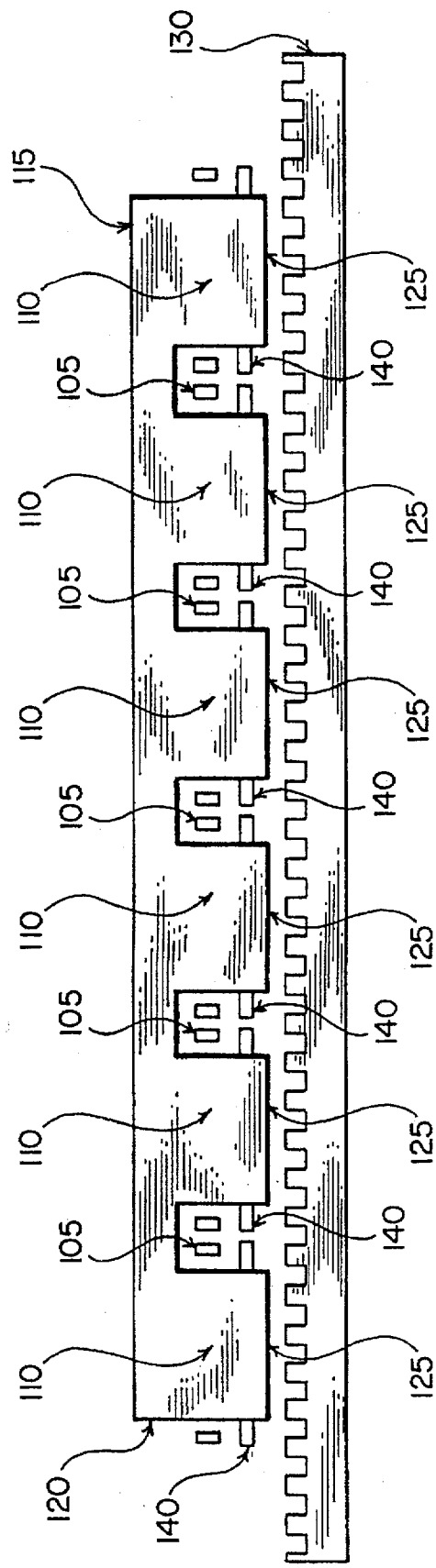
FIG. 1 is a diagram showing a superconducting magnet which uses LTS coils operating in DC mode.

A MAGLEV transportation system generally includes an aerodynamically-designed transport vehicle containing a passenger compartment, a guideway having one or more rails for guiding the transport vehicle along a predetermined route, and an electromagnetic suspension member mounted on the transport vehicle for carrying one or more superconducting magnets in spaced relation to the guideway rails.

The transport vehicle design, including its size, shape, and transport capacity, is left wholly within the discretion of the system designer in the context of the present invention. The transport vehicle is not to be limited to any particular type of vehicle, whether passenger or freight, or to a particular application such as high-speed mass transportation of persons over long distances. The manner in which the transport vehicle is adapted for magnetic levitation travel is also a consideration left to the system designer.

The vehicle guideway contains one or two ferromagnetic reaction rails having patterns of alternating groove-and-teeth pairs. Each rail groove may be fitted with a three-phase ground coil for imparting propulsive forces to the transport vehicle in a manner to be described below. These ground coils may also be used to provide tractive force measurements.

The suspension member may be adapted for use with a single- or dual-rail guideway. For a single-rail guideway, the suspension member may be of the T-bar type which carries superconducting magnets along a central longitudinal axis of the transport vehicle. For a dual-rail guideway, the suspension member may be of the type disclosed in U.S. patent application Ser. No. 07/875,641, which carries a row of superconducting magnets on both sides of the transport vehicle above the guideway rails.

The present invention is, in a first respect, a superconducting magnet for levitating and propelling a MAGLEV transport vehicle along a guideway, and, in a second respect, a superconducting coil within the magnet uniquely-designed to outperform LTS coils operating in DC mode.

Several aspects of the superconducting coil of the present invention enable it to outperform DC LTS coils. One aspect is the ability of the coil of the present invention to operate in AC mode as well as DC mode, an accomplishment which heretofore has been unrealized in the relevant art.

Another aspect is the ability of the superconducting coil to operate at both high and low superconducting temperatures.

Another aspect is the ability to combine the first two aspects to provide a high-temperature superconducting coil operating in AC mode, another accomplishment heretofore unrealized in the prior art.

All of these aspects and other advantages of the superconducting coil and magnet of the present invention will now be discussed.

As previously noted, the superconducting coil of the present invention may be configured to operate at high or high superconducting temperatures. This is accomplished by constructing the windings of the coil out of a material which is able to demonstrate superconductivity over a wide range of temperatures. The superconducting material preferably takes the form of a superconductor tape, but round, square, or rectangular geometries may be used.

A preferred superconductor for constructing the coil of the present invention is a bismuth-based tape such as Bi(2223), which advantageously demonstrates superconductivity at any temperature lying in a range between 4.2 K. and 80 K. inclusive. Superconductor tapes made of other metals which demonstrate at least high-temperature superconductivity may be used in the alternative.

The performance characteristics of Bi(2223) will now be discussed. The current density of a Bi(2223) superconductor tape is sensitive both to the applied field strength and the orientation of the field with respect to the broad surface of the tape. It has been reported in the article Behavior of Critical Currents in Bi—Pb—Sr—Ca—Cu—O/Ag Tapes from Transport and Magnetization Measurements: Dependence upon Temperature, Magnetic Field, and Field Orientation, Physical Review B, Volume 45, Number 13, Apr. 1, 1992, page 45, that the field component perpendicular to the broad surface of the superconductor tape alone determines the critical current density of the tape, and that the tape behaves as if transparent to the parallel component of the field.

FIG. 2 is a graph showing six curves plotting the performance of Bi(2223) superconductor tape operating at a variety of temperatures under conditions where the field is parallel to the broad surface of the tape. Curve X on the graph shows that Bi(2223) superconductor tape operating at 77 K. has $J_c$ values of 54,000 A/cm$^2$ at a 0 T field and 8,000 A/cm$^2$ at 0.5 T field, which are represented on the graph as points B1 and B2, respectively. Other points on Curve X approximate the performance of this tape at intermediate field levels. The remaining curves in FIG. 2 plot the performance of Bi(2223) superconductor tape operating at temperatures of 4.2 K., 20 K., 40 K., 60 K., 77 K., and 90 K.

FIG. 3 is a graph showing six curves plotting the performance of Bi(2223) superconductor tape operating at the same variety of temperatures under conditions where the field is perpendicular to the broad surface of the tape. Curve Y on this graph shows that Bi(2223) superconductor tape operating at 77 K. has $J_c$ values of 10,500 A/cm$^2$ at 0 T field and 900 A/cm$^2$ at 0.5 T field, which are represented on the graph as points B3 and B4, respectively. The remaining curves in FIG. 3 plot the performance of Bi(2223) tape at 4.2 K., 20 K., 40 K., 60 K., 77 K., and 90 K.

The superconducting coil of the present invention may be configured to operate at any temperature between 5 K. and 80 K. to meet the requirements of the system in which it is to be employed. The precise operating temperature of the coil, however, ultimately depends on the length and dimensions of the superconductor tape selected to fabricate the windings of the coil.

In order to achieve the magnetic field required by a MAGLEV system, the number of windings of the coil, and thus the length of superconductor tape needed to construct the windings, must be very large. The lengths of superconductor tape required are at least hundreds and probably thousands of meters, depending upon the desired operating temperature of the coil. Tapes of this length, if they can be found, are very expensive to procure.

In order to minimize the superconductor tape lengths required to fabricate the coil windings, the superconducting coil of the present invention advantageously may be constructed from at least one layer of a predetermined number of epoxy-impregnated pancake coils assembled along a common axis and secured between two aluminum support members of a cryostat used to cool the coil.

The parameters for one possible configuration of the superconducting coil of the present invention constructed from a single layer of pancake coils are summarized in Table 1 below:

TABLE 1

| Parameter | Unit | Coil |
|---|---|---|
| Total ampere-turns | kA-turns | 30 |
| Peak field | | |
| Bx | kG | 4.0 |
| By | kG | 0.8 |
| /B/ | kG | 4.1 |
| Mean-turn length | m | 1.6 |
| Energy stored in each coil | kJ | 5.3 |
| HTS tape size | | |
| width | mm | 5.0 |
| thickness | mm | 0.1 |
| insulation | mm | 0.01 |
| Superconductor core Jc at 77K and at 0.5 T | A/mm$^2$ | 48 |
| Silver to superconductor core ratio | | 3 |
| Io/Ic | | 0.85 |

As shown in Table 1, the superconducting coil is constructed from ten pancake coils each operating at 77 K. Each pancake coil, in turn, is constructed from twenty Bi(2223) superconductor tapes each 5 mm in width, 0.1 mm in thickness, and 360 m in length. The total superconductor tape length in the superconducting coil is 7235 m. (One pancake coil must include 35 m of additional tape to enable the superconducting coil to reach a desired field.) A 0.01 mm thick insulation layer is also included on the tape, increasing the thickness of the tape to 0.11 mm. The total ampere-turns of the superconducting coil, contributed from all ten pancake coils, is 30 kA-turns and the $I_o/I_c$ is 0.85. The operating current of the superconductor tape is 20 A.

The Bi(2223) superconductor tape used to fabricate the pancake coils contains a silver-to-superconductor ratio of approximately 3, which makes the current density over the entire cross-section of the conductor approximately one-fourth of the values quoted above.

The peak X- and Y-components of the magnetic field ($B_x$, $B_y$) in the superconducting coil are 3.9 kG and 1.8 kG, respectively, and the magnetic field strength is 4.3 kG. (The X-component represents the component of the field lying perpendicular to the broad surface of the tape.) The critical current density $J_c$ at the core of the superconducting coil, as determined by the X-component of the field, is 48 A/mm$^2$ at 0.5 T applied magnetic field at 77 K. This point is represented as B5 on Curve Y on the graph depicted in FIG. 3.

The superconducting coil of the present invention may be configured to operate at temperatures other than 77 K. if required. Table 2, for example, shows the design parameters for a superconducting coil of the present invention operating at 60 K., 40 K., and 20 K. Table 2 demonstrates, inter alia, that the quantity of superconductor tape required diminishes with the operating temperature of the superconducting coil.

TABLE 2

| Parameter | Unit | 77K Design | 60K Design | 40K Design | 20K Design |
| --- | --- | --- | --- | --- | --- |
| Coil Current | A | 20 | 100 | 100 | 200 |
| Number of pancakes | | 10 | 10 | 10 | 10 |
| Longest conductor length | m | 360 | 144 | 72 | 48 |
| Total conductor length/coil | m | 7,235 | 1,440 | 710 | 480 |

A superconducting coil operating at 60 K. may be constructed from ten pancake coils, each fabricated from Bi(2223) superconducting tape 144 meters in length, to produce a coil having a total superconductor tape length of 1440 meters. The operating current for this coil is be 100 A.

A superconducting coil operating at 40 K. may be constructed from 10 pancake coils, each fabricated from Bi(2223) superconductor tape 72 meters in length. The total superconductor tape length for the superconducting coil would be 710 meters. The operating current for this coil is 100 A.

And, a superconductor coil operating at 20 K. may be constructed from 10 pancake coils, each fabricated from Bi(2223) superconductor tape 48 meters in length. The total superconductor tape length for the coil would therefore be 480 meters. The operating temperature for this coil is 200 A.

The superconductor tape lengths set forth in Table 2 correspond to pancake coils wound from a single length of superconductor tape. If superconductor tapes of these lengths cannot be commercially obtained, the coil may, for example, be constructed from nine pancake coils, each wound in-hand with five Bi(2223) superconductor tapes each operating at 35 A. These five tapes combine to produce a superconducting coil having 90 turns. The maximum superconductor tape length for constructing any pancake coil in this alternative configuration is 144 m, although 300 m tape lengths may be used if commercially available. The overall dimensions of the superconducting coil winding pack are 48.6×49.5 mm formed from a total of 650 m of superconductor tape.

Although specifically described for use in a MAGLEV system, the superconducting coil of the present invention may be adapted to function in a variety of electrical systems which rely on an iron core to carry magnetic flux. Examples of these other systems include electric motors and generators (both AC and DC), transformers, chokes, energy storage inductor, and electromagnetic shielding.

The superconducting magnet of the present invention performs two principal functions. One, it interacts with a rail of a vehicle guideway to provide magnetic forces of attraction necessary to levitate the transport vehicle in a manner which will be described in greater detail below.

Two, it serves as a field magnet to enable a linear motion device, such as a linear synchronous motor, to provide the thrust required to propel the transport vehicle in a manner that will now be described. As the transport vehicle travels along the guideway, the superconducting magnets react with the field produced by the ground coils in the grooves of the rail by inducing excitation current in those coils, an effect of which is to cause each core pole to surf on a magnetic wave created by the changing current in each successive ground coil.

The superconducting magnet in accordance with the present invention includes at least one superconducting coil of the present invention surrounding a multiple-pole iron core. The coil may be tailored to meet the requirements of any magnet design selected, and may be operated in AC mode or DC mode as well as any temperature lying in a range between 5 K. and 80 K. The coil can operate under these conditions at fast and slow speeds, and at rest.

Figure 4:
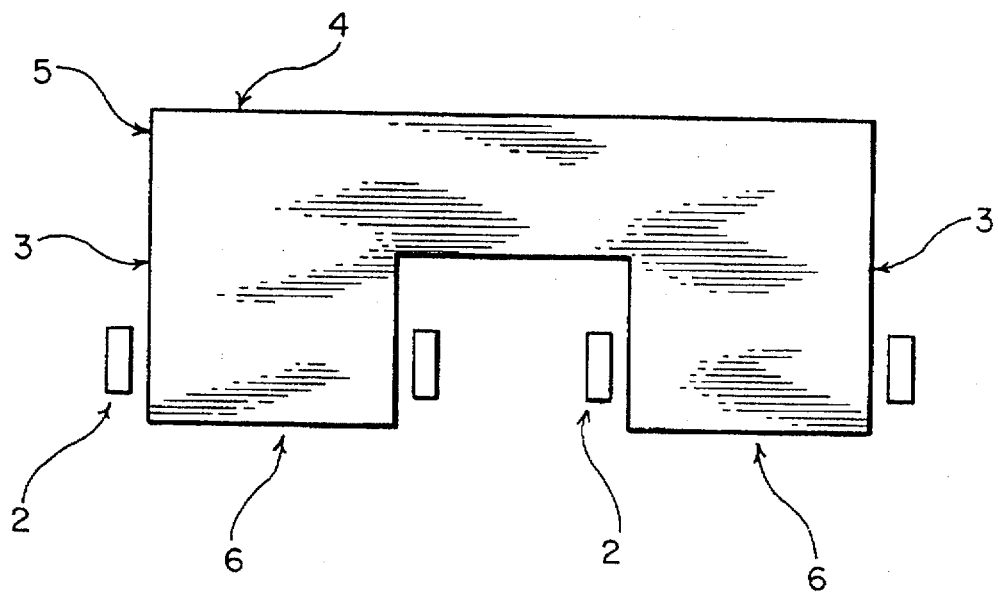
FIG. 4 is a diagram showing a first preferred embodiment of the superconducting magnet of the present invention.

Referring to FIG. 4, a first preferred embodiment of the superconducting magnet 1 of the present invention includes two HTS coils 2 operating in AC mode surrounding respectively two leg portions 3 of a C-shaped, laminated iron core 4. The leg portions of the core project from a base portion 5 and include at their respective distal ends two magnetic pole surfaces 6, which are suspended a predetermined distance away from and in opposing relation to a ferromagnetic rail (not shown) of a vehicle guideway. HTS coils 2 are preferably constructed from Bi(2223) superconductor tape. The preferred operating temperature for the HTS coils is 77 K.

The cryogenic system for the HTS coils preferably is an open-cycle liquid-nitrogen-based system that requires no on-board refrigerator to maintain the coils in a superconducting state. The ability of the coils to function without an on-board refrigerator is desirable in order to reduce the costs associated with operating and maintaining the superconducting magnet of the present invention. An on-board refrigerator, however, may be included if operating constraints and economy permit.

Figure 5:
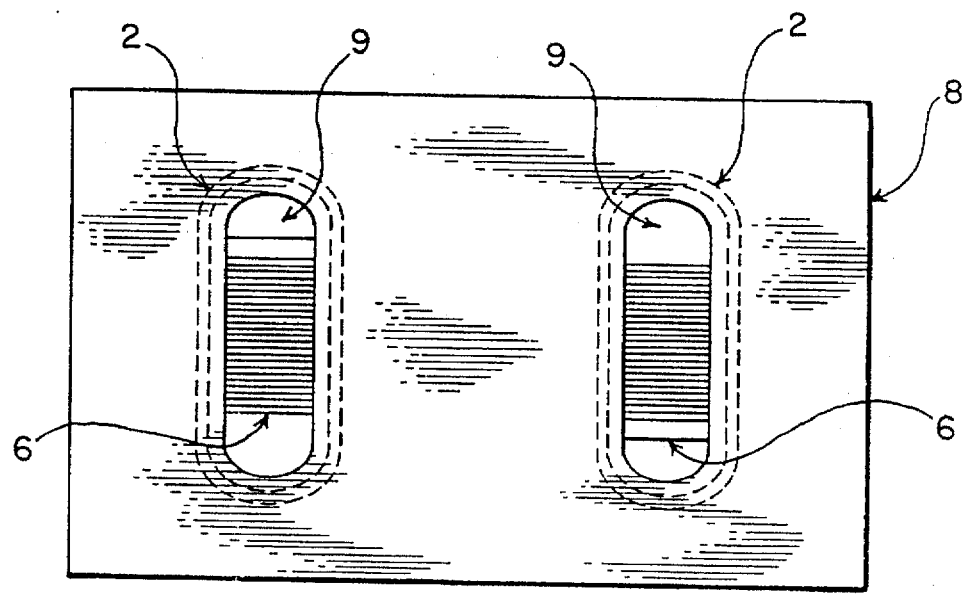
FIG. 5 is a schematic diagram of a common cryostat contemplated for use in accordance with the first preferred embodiment of the superconducting magnet of the present invention.

The physical requirements of the cryogenic system may be satisfied in either of two ways. One, as shown in FIG. 5, a common cryostat 8 attached to the iron core may be used to house both HTS coils. This type of cryostat includes two warm-air bores 9 for accommodating respectively the two poles 6 of the iron core. The HTS coils within the cryostat (indicated by the dotted lines) are oriented in such a manner so as to be concentric with the bores surrounding their respective core poles. The orientation of cryostat 8 may be adjusted both to center the coils with respect to the core poles and to minimize the forces exerted on the coils and the cryostat. In the alternative, individual cryostats for each HTS coil may be adjustably mounted around each pole of the core.

Cryostat 8 includes an aluminum support vessel (not shown) for supporting both HTS coils and a Supply of liquid nitrogen for maintaining the HTS coils in a superconducting state at 77 K. for at least 48 uninterrupted hours. The support vessel may be enveloped within a room-temperature vacuum vessel (also not shown) for insulating the support vessel from heat leakage from the surrounding environment.

Of course, if the superconducting magnet of the present invention requires the use of a superconducting coil at lower temperatures, the cryogenic system must be adapted to meet these needs.

HTS coils 2 advantageously operate in AC mode in a manner which will now be explained. AC excitation current supplied to the HTS coils causes the coils to induce magnetic fields in their respective core poles. The core poles, as a result, become magnetically attracted to a vehicle guideway, counterbalancing the loading of the MAGLEV vehicle to cause the vehicle to levitate off the surface of the rail by a distance proportional to the strength of the magnetic fields induced in the cores. Operating in AC mode in this fashion represents a substantial improvement over conventional LTS coils which are required to operate in DC mode or risk lapsing into a non-superconducting state.

The HTS coils are able to operate in AC mode because of the favorable performance characteristics demonstrated by the Bi(2223) superconductor tape used to construct the coils. These performance characteristics were reported in the article *AC Losses in Powder-in-Tube $Bi_2Ca_2Sr_2Cu_3O_{10}$ Tapes at Power Frequencies*, Applied Physics Letter, Volume 60, Jan. 13, 1992, page 252. In that article, AC losses for bismuth-based tapes were measured up to a frequency of 200 Hz. The primary component of the measured losses was hysterisis loss; the eddy current losses were found to be negligible. These types of tapes prove to be adequate for constructing the HTS coils of the present invention because the AC losses for these tapes are near zero at 20 Hz, which would likely be the highest field perturbations experienced by the MAGLEV coils.

Having the ability to operate at frequencies as high as 20 Hz without realizing significant AC losses enables the HTS coils to correct pole-to-rail gap deviations without assistance from control coils, which conventional LTS superconducting magnets operating in DC mode rely on to perform this function. The total excitation required to levitate and propel a MAGLEV vehicle as well as the control needed to correct deviations in the gap between the core poles and rail may therefore be accomplished using a single HTS coil surrounding each of the core poles.

If desired, the HTS coils may operate in either AC or DC mode without any modification. Operation in DC mode may be achieved simply by supplying DC excitation current to the coils.

Figure 6:
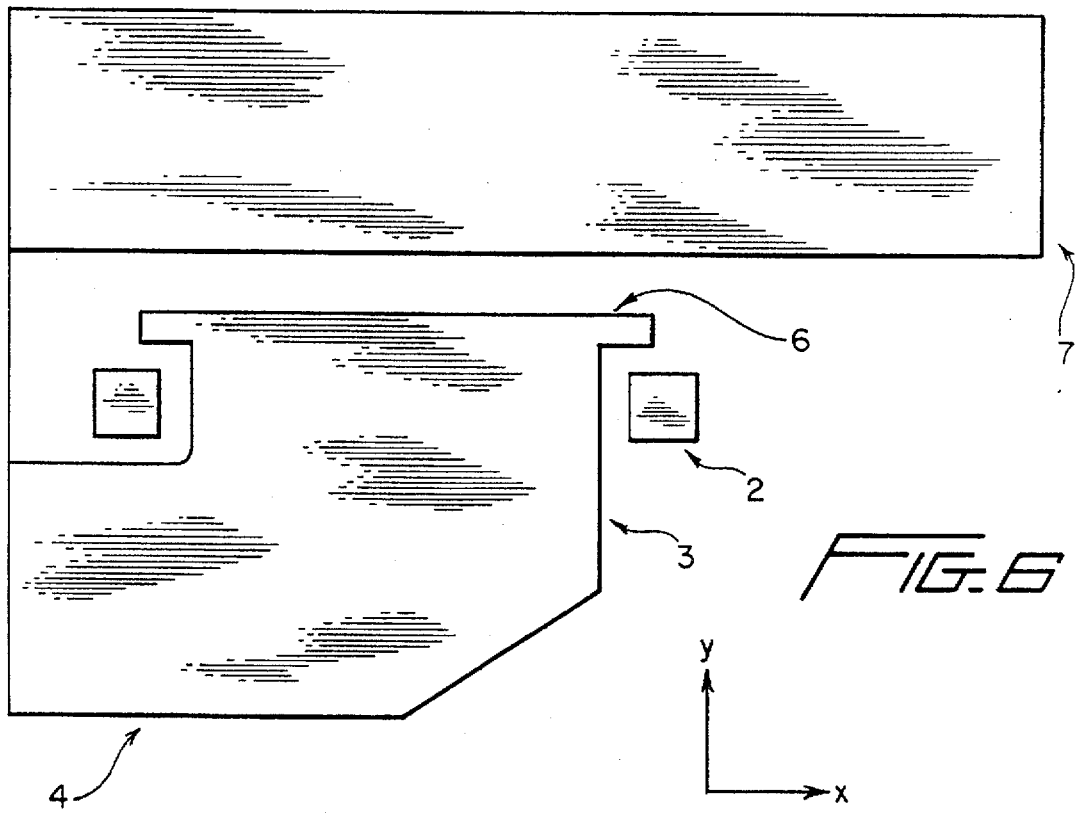
FIG. 6 is a diagram showing a blown-up view of a portion of the first preferred embodiment of the superconducting magnet of the present invention.

FIG. 6 shows one half of the two-pole superconducting magnet shown in FIG. 4. Depicted therein, in FIG. 6, is a pole surface 6 located at the end of leg portion 3 of the C-shaped core 4. Pole 6 is held in spaced relation to a rail 7. HTS coil 2 surrounding the pole may be fabricated from a predetermined number of pancake coils. The superconductor tapes used to construct each pancake coil have its broad surface oriented parallel to leg portion 3 of the core. Although pole 6 (FIG. 6) has a shoe (pole surface is wider than the body), it will also work without a pole shoe.

Figure 7:
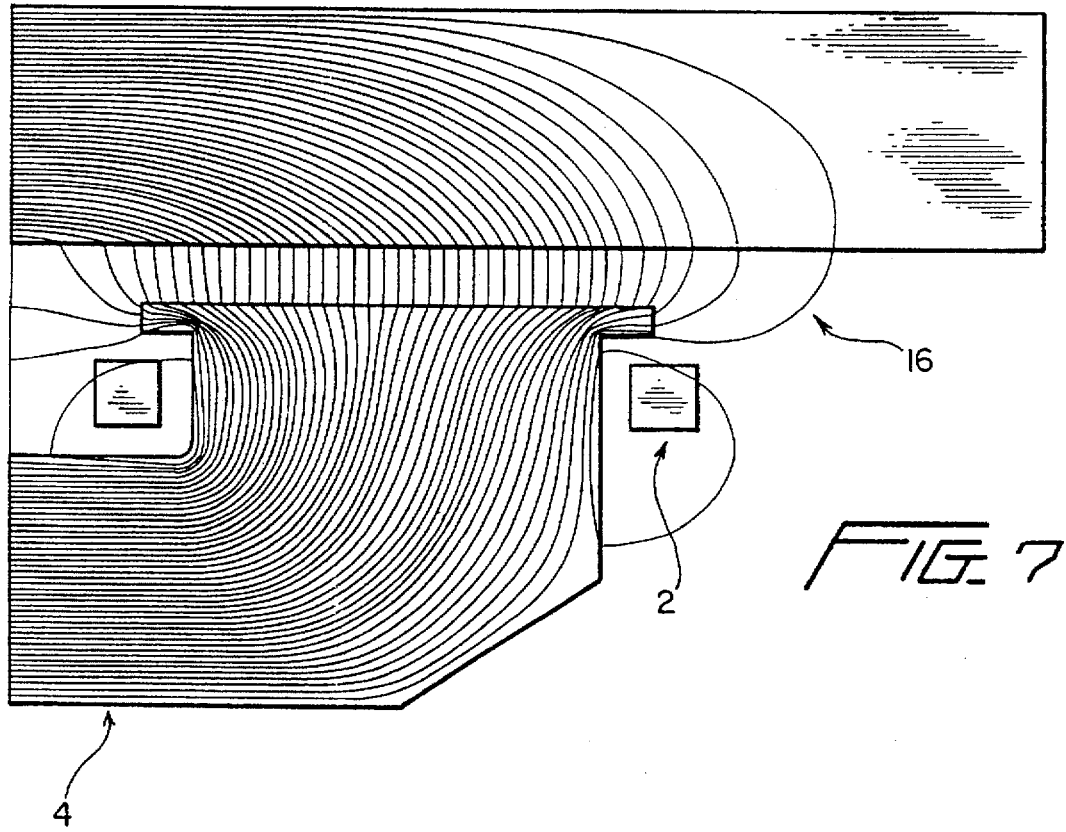
FIG. 7 is a diagram showing the magnetic field distribution in an area surrounding the portion of the first preferred embodiment of the superconducting magnet of the present invention shown in FIG. 7.

FIG. 7 shows the magnetic field distribution in an area surrounding the one half of the two-pole magnet shown in FIG. 4. This distribution shows that there is minimal leakage field in coil winding pack. Most of the magnetic flux (indicated generally by line 16) is contained within the iron core.

The peak field at the pancakes near the reaction rail is 4.3 kG (3.9 along x-axis and 1.8 kG along y-axis). Total ampere-turns to be produced by each coil is 30 kA-turns. The mean-turn-length for each coil is 1.6 m. The small magnetic fields and forces existing in the HTS coil make the superconducting coil of the present invention ideal for operating at high superconducting temperatures.

Referring to FIG. 8, a second preferred embodiment of the superconducting magnet of the present invention includes six HTS coils 20 operating in AC mode surrounding respectively six leg portions 21 of a laminated iron core 22. The leg portions of the core project from a base portion 23 and include at their respective distal ends six alternating north and south magnetic pole surfaces 25, which are suspended a predetermined distance away from and in opposing relation to a ferromagnetic rail 26 of a vehicle guideway.

A common cryostat 27 used to satisfy the refrigeration requirements of all six HTS coils is shown in FIG. 9. Cryostat operates in a manner analogous to the cryostat shown in FIG. 5, and like that cryostat may include an inner vessel (not shown), enclosed within a single room-temperature vacuum vessel (also not shown), for supporting all six coils and the liquid nitrogen refrigerant used to cool the coils to an operating temperature of 77 K. In the alternative, individual cryostats may be employed for each of the six HTS coils.

The six-pole configuration operates in a manner analogous to the two-pole embodiment of the invention described above with respect to levitating and propelling a MAGLEV vehicle along a guideway.

Figure 10:
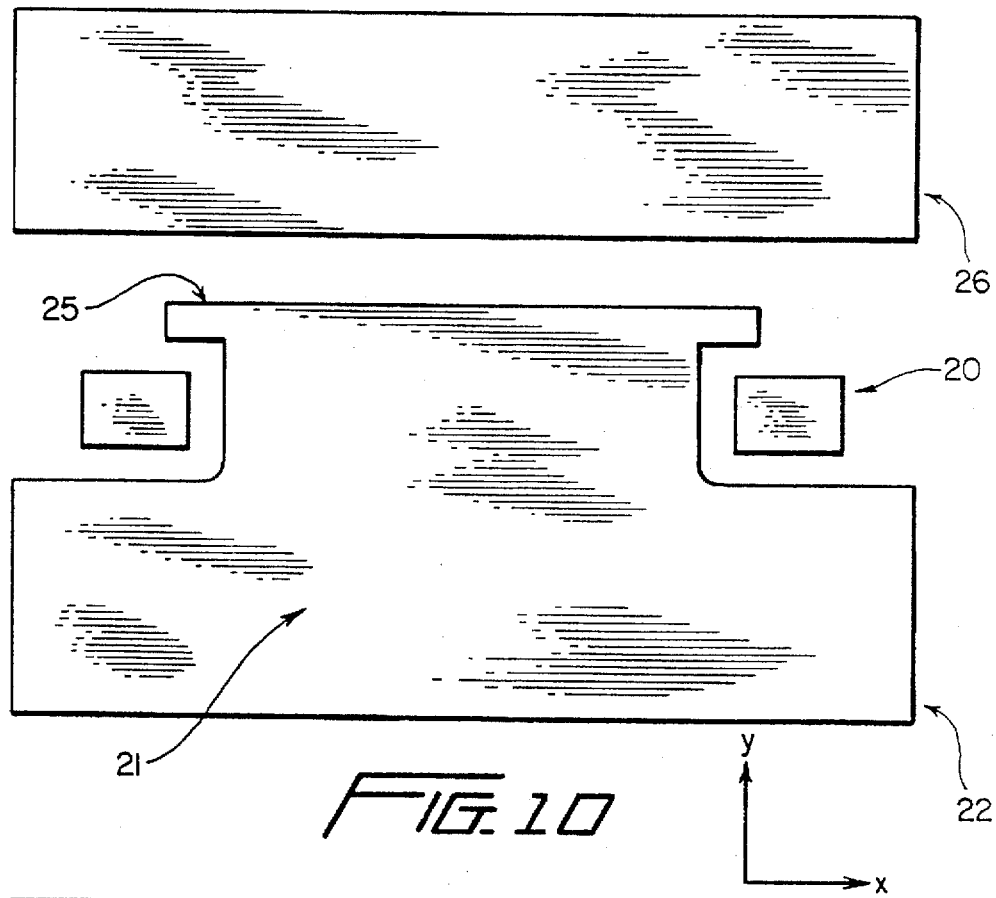
FIG. 10 is a diagram showing a view of a portion of the second preferred embodiment of the present invention.

FIG. 10 shows one pole of the six pole assembly shown in FIG. 8. Depicted therein, in FIG. 10, is a pole surface 25 located at the end of leg portion 21 of core 22. Pole 25 is held in spaced relation to a rail 26. HTS coil 20 surrounding the pole may be fabricated from a predetermined number of pancake coils. The superconductor tapes used to construct each pancake coil have their broad surface oriented parallel to leg portion 21 of the core. A small shoe (optional as shown in FIG. 10) may be included at the end of the pole for reducing the field in the HTS winding.

Figure 11:
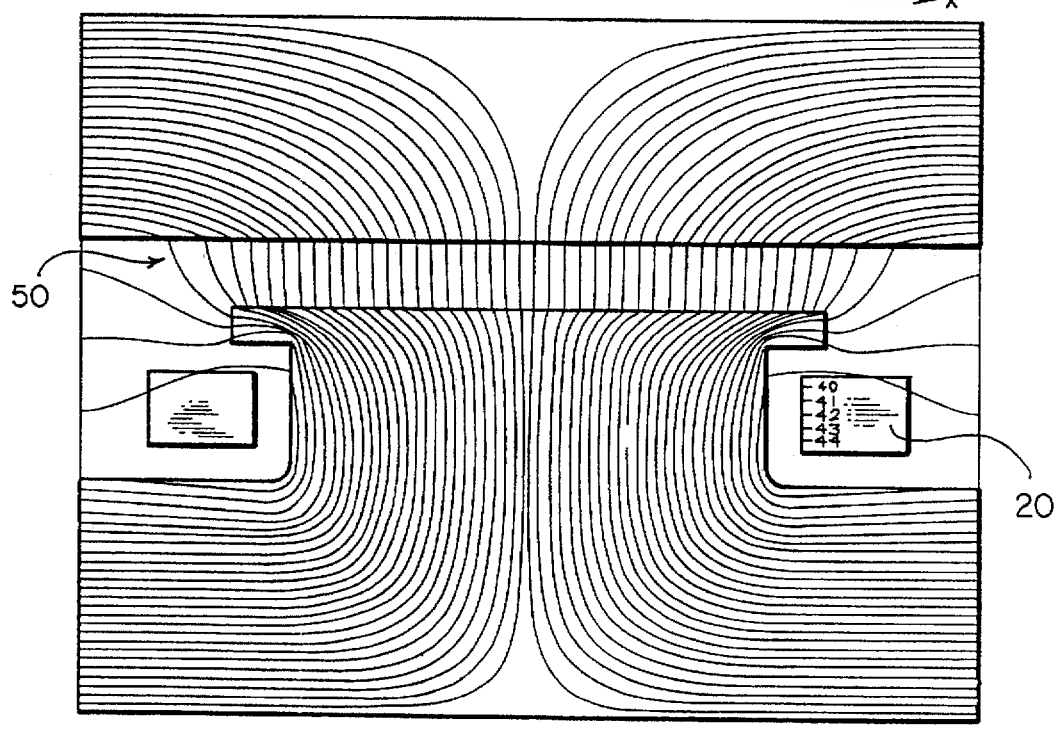
FIG. 11 is a diagram showing the magnetic field distribution in an area surrounding the portion of the second preferred embodiment of the superconducting magnet shown in FIG.

FIG. 11 shows the magnetic field distribution in an area surrounding the one pole of FIG. 10. The distribution shows that there is very little magnetic field in the windings of the HTS coil, and that most of the magnetic flux (indicated generally by line 50) is contained within the iron core.

The peak field generated by the HTS coil is less than 3 kG, which can be produced with only 40 kA-turns. The magnetic field distribution inside the HTS winding is highest along the winding face near the pole iron. The field values for the field locations marked 40, 41, 42, 43, 44, and 45 in FIG. 11 are set forth in Table 3 below:

TABLE 3

| Location | $B_y$ (kG) | $B_x$ (kG) | IBI (kG) |
| --- | --- | --- | --- |
| 41 | 0.39 | −2.92 | 2.94 |
| 42 | 0.80 | −2.27 | 2.41 |
| 43 | 0.97 | −1.63 | 1.89 |
| 44 | 0.98 | −0.95 | 1.36 |
| 45 | 0.82 | −0.26 | 0.86 |

The superconducting magnet of the present invention is not limited to the two- and six-pole embodiments discussed above. Variations may include a core shape with any number of poles and any number of superconducting coils circumscribing those poles. Each of these magnets would operate in a manner analogous to the two- and six-pole configurations.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. An electromagnet, comprising:
   a magnetically-permeable core having a plurality of magnetic poles; and
   a plurality of superconducting coils made of a material capable of operating in AC mode, each of said coils surrounding a different one of said poles for inducing a magnetic field in said poles when current is supplied to said coils,
   wherein said superconducting coils operate in both AC and DC modes.

2. The electromagnet recited in claim 1, wherein said superconducting coils operate at a temperature lying in a range between 5 K. and 80 K. inclusive.

3. The electromagnet recited in claim 1, wherein said electromagnet provides magnetic forces for levitating and propelling a magnetic levitation vehicle along a ferromagnetic guide rail, the poles of said core facing the rail and being separated therefrom by an air gap of a predetermined length.

4. The electromagnet recited in claim 3, wherein said superconducting coils are supplied with excitation current in response to changes in the air gap length for effecting an increase in the magnetic forces of attraction between the core poles and rails to correct said air gap length back to said predetermined length.

5. The electromagnet recited in claim 4, wherein said coils operate at a frequency lying in a range between 0 Hz and 20 Hz inclusive.

6. The electromagnet recited in claim 1, wherein each of said coils have windings constructed from Bi(2223) superconductor tape.

7. The electromagnet recited in claim 1, wherein said core is fabricated from laminated iron.

8. The electromagnet recited in claim 1, wherein said core has a substantially C-shape including a base portion and two leg portions projecting from said base, distal ends of said leg portions including said magnetic poles.

9. The electromagnet recited in claim 1, wherein said core has six leg portions projecting from a base portion, distal ends of said leg portions including said magnetic poles.

10. The electromagnet recited in claim 1, wherein each of said coils is constructed from a layer of a predetermined number of pancake coils assembled together along a common axis.

11. The electromagnet recited in claim 10, wherein each of said pancake coils is constructed from a predetermined number of superconductor tapes.

12. The electromagnet recited in claim 1, further comprising:
a single cryostat for supporting said coils and a supply of refrigerant for cooling said coils, said cryostat having a predetermined number of warm-air bores each surrounding a different core pole, said coils oriented so as to be concentric with respective ones of said bores.

13. The electromagnet recited in claim 12, wherein said predetermined number of bores equals the number of said coils.

14. The electromagnet recited in claim 12, wherein said refrigerant is liquid nitrogen for cooling said coils to a temperature of 77 K.

15. A superconducting coil made of a material capable of operating in AC mode, comprising;
a winding pack including a predetermined number of pancake coils assembled together along a common axis, each of said pancake-coils having windings constructed from a preselected superconductor tape, said tape being of a type which demonstrates approximately zero AC losses at frequencies lying in a range between 0 HZ and 20 Hz,
wherein said coil operates in both AC and DC modes.

16. The superconducting coil recited in claim 15, wherein said coil operates at a temperatures lying in a range between 5 K. and 80 K. inclusive.

17. The superconducting coil recited in claim 16, further comprising:
a cryostat containing a supply of liquid nitrogen for cooling the coil to an operating temperature of 77 K.

18. The superconducting coil recited in claim 15, wherein said superconductor tape is Bi(2223) tape.

* * * * *